United States Patent [19]

Diem

[11] 4,141,438

[45] Feb. 27, 1979

[54] RETRACTABLE CORD REEL

[76] Inventor: Clarence J. Diem, Evergreen Park, R.R. #2, Davenport, Iowa 52804

[21] Appl. No.: 852,709

[22] Filed: Nov. 18, 1977

Related U.S. Application Data

[63] Continuation-in-part of Ser. No. 756,019, Jan. 3, 1977, abandoned.

[51] Int. Cl.² ............................................. H02G 11/02
[52] U.S. Cl. .............................. 191/12.4; 191/12.2 R
[58] Field of Search .................... 191/12.2 R, 12.4; 242/107.7; 339/2 R, 2 RL, 3 R, 5 R, 5 RL, 6 R, 6 RL, 8 R, 8 RL

[56] References Cited

U.S. PATENT DOCUMENTS

| | | | |
|---|---|---|---|
| 2,565,452 | 8/1951 | Johnson | 191/12.2 R |
| 2,647,960 | 8/1953 | Benjamin | 191/12.4 |
| 3,450,369 | 6/1969 | Blanch | 191/12.2 R |
| 3,929,210 | 12/1975 | Cutler | 191/12.4 |

Primary Examiner—Trygve M. Blix
Assistant Examiner—Reinhard J. Eisenzopf
Attorney, Agent, or Firm—Glenn H. Antrim

[57] ABSTRACT

A reel assembly is especially adapted for winding an electrical service cord in either recreational or industrial vehicles. The reel has flanges rotatively mounted to an arbor, and only one end of the arbor is fastened to a rigid supporting member. The reel assembly therefore has one flange clear of any obstruction so that the electrical cord can be wound readily over the end of the reel to adjust tension, and the mounting provides easy assembly and disassembly. In a preferred embodiment, the reel is held on the arbor by a single fastener associated with a slip-ring assembly. A notched ratchet disk has protrusions adjacent its notches to cause a pawl to jump across the notches except at slow speeds. For safety, a grounding circuit is completed through a special conductive, retractive spring to eliminate open circuits sometimes encountered with usual sets of electrical contacts.

6 Claims, 7 Drawing Figures

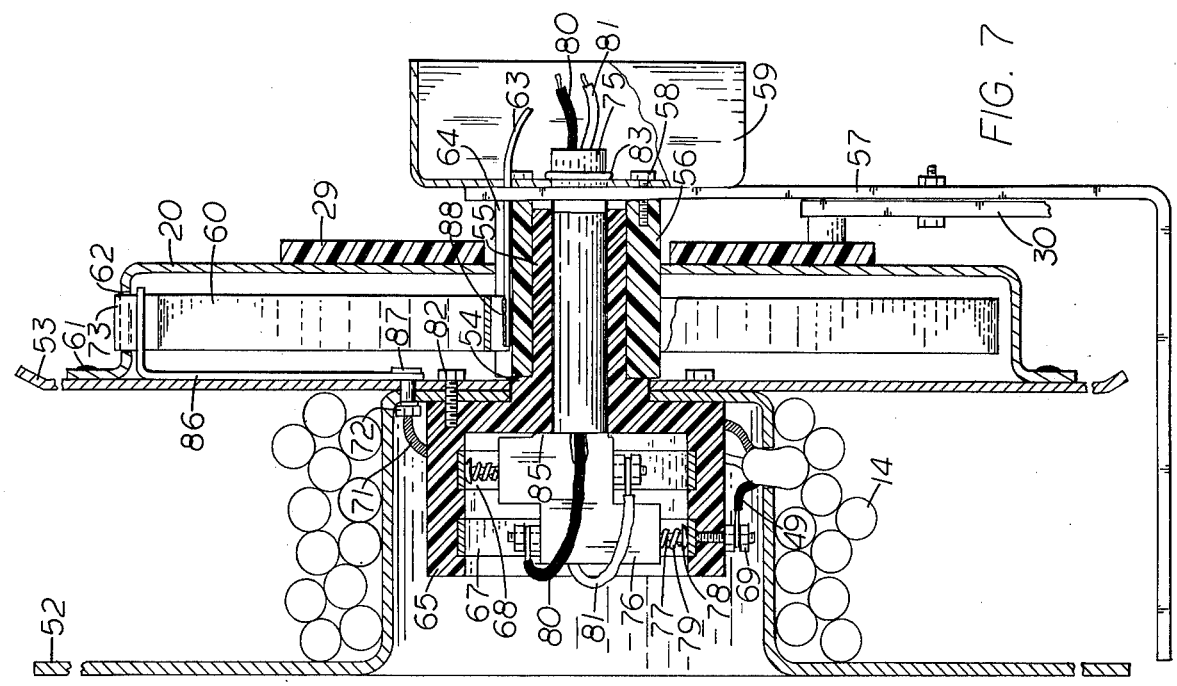

RETRACTABLE CORD REEL

BACKGROUND OF THE INVENTION

This is a continuation-in-part of application Ser. No. 756,019 filed Jan. 3, 1977 and now abandoned.

This invention relates to retractable reels for electrical cords, and particularly to reels that are quite large and are suitable for storing connecting cords such as those used for connecting the wiring of recreational vehicles.

Small retractable reels are often connected to home appliances for storing their electrical connecting cords and for extending only the amounts of cords that are required during use. For use in machine shops and repair shops, reels of moderate size are used overhead to make either tubes or cords readily available and readily retractable to keep work areas clear. Reels for heavy-duty industrial applications are quite large and are mounted on stands that have a supporting member along each side of the reels. Reels of the various sizes have spiral springs and ratchets for use in retracting the cords.

Recreational vehicles have heavy-duty, three conductor cords for connecting lighting circuits and appliances to usual power circuits that are provided near parking places of the vehicles. Usually these cords are coiled manually and placed in compartments provided in the vehicles. For safety, a grounding circuit through a reel needs to provide a continuous circuit as reliably as a direct connection provided by a manually coiled cord. Suitable reels that will mount within the limited space of the compartments and coil the cords neatly and quickly have generally not been available. For this application, a desirable reel of the type having a spiral spring and a ratchet requires a suitable mounting, must provide a reliable grounding circuit for safety, has provisions for readily changing the tension of the spring to compensate for different amounts of stiffness of the cords caused by changes in temperature, and preferably is easily disassembled and reassembled for maintenance.

SUMMARY OF THE INVENTION

A reel according to the present invention is constructed such that it can be readily disassembled for repair or adjustment, has a bracket at only one end of the reel to facilitate mounting the reel in a recreational vehicle while still permitting a heavy duty electrical cord to be wound about one of the flanges of the reel for easily adjusting the tension of the reel, has a third-wire grounding circuit that is completed through a conductive, retractive spring rather than through contacts, and has a durable, simple ratchet device for stopping the reel when a desired amount of cord is extended. The flanges of a reel on which a cord is to be wound are supported on one end of an axle. The other end of the axle is inserted in the bore of an arbor, and the end of the arbor opposite the flanges is secured to a rigid supporting member. A strong, spiral, retractive spring has its outer end connected to the flanges and has its inner end retained in a groove in the arbor.

A ratchet comprises a pawl and a notched disk, the notched disk being coaxially connected to the outer face of a housing member about the spring, and the pawl being rotatively connected to the rigid supporting member. The notched disk for the ratchet has protrusions at the edges of the notches such that the end of the pawl that tends to fall into the notches is thrown outwardly and jumps across the notches while the reel is rotating at a rate faster than a predetermined slow rate.

The slip-ring assembly in the circuit of the electrical conductors that carry electrical power also function as a retainer for holding the axle that supports the flanges of the reel within the arbor. The portion of the slip-ring assembly to which fixed contacts are attached has an extending tubular portion that extends through the center of the axle and the arbor. The portion to which the contacts are assembled bears against the rotatable flange assembly for retaining the axle of the flange assembly in a central bore of the arbor, and a single retainer on the opposite end of the tubular, extending portion of the contact assembly bears against the rigid, supporting member. In a preferred embodiment, the single retainer holds both the slip-ring assembly and the flange assembly to the arbor. The conductors connected to the ring assembly for carrying power extend through the tubular portion of the slip-ring assembly.

The spiral retractive spring is made of special conductive material and is connected to complete a grounding circuit through a grounding conductor of the extension cord from a power receptacle to appliances that utilize electrical power. Preferably, the inner end of the retractive spring fits into a longitudinal groove along the arbor, and a grounding conductor that is fastened to the inner end of the spring extends along the groove and out through a hole in the rigid supporting member for connection to the grounding circuits of the appliances that are to utilize power. The outer end of the retractive spring is connected through a conductive strap along one of the flanges to the grounding conductor of the extension cord.

BRIEF DESCRIPTION OF THE DRAWING

FIG. 5 is a perspective view from the mounting side of another embodiment of the reel;

FIG. 6 is a perspective view of the opposite side of the reel of FIG. 5 showing an exploded slip-ring assembly; and FIG. 7 is a fragmentary cross-sectional view showing assembly of the reel of FIGS. 5 and 6 on an arbor.

DESCRIPTION OF THE PREFERRED EMBODIMENTS

Figure 1:
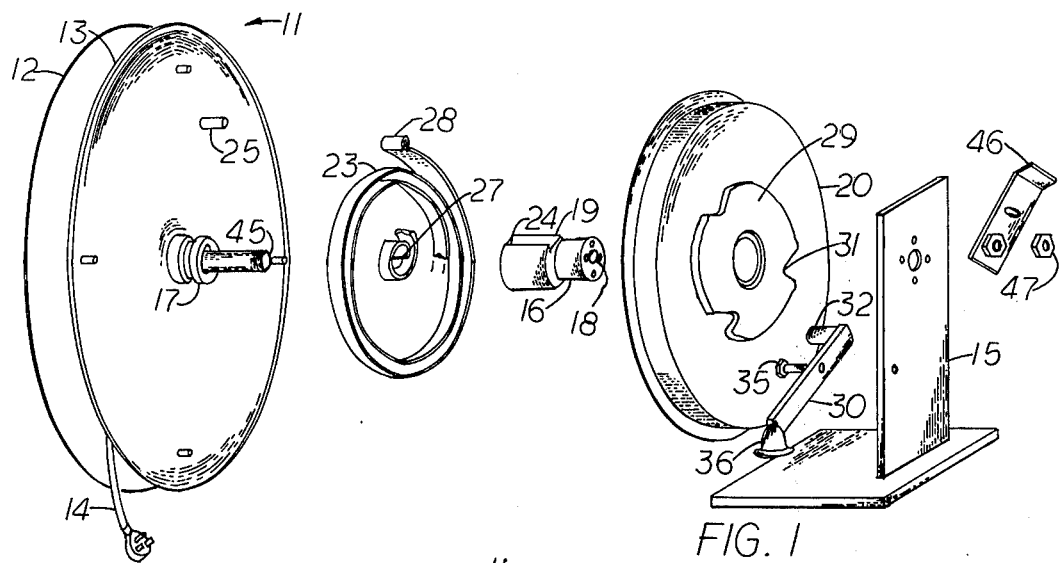
FIG. 1 is an exploded perspective view of a portion of a reel assembly facing its mounting bracket.
Figure 2:
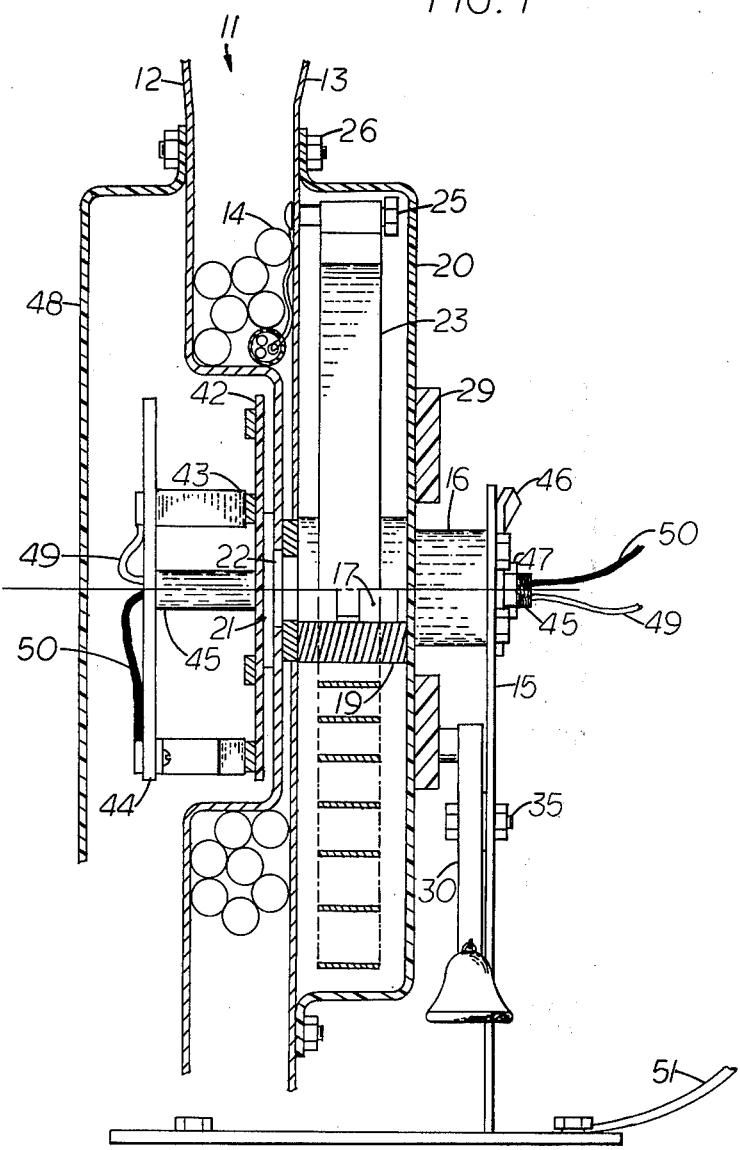
FIG. 2 is a fragmentary cross-sectional view showing assembly of the reel of FIG. 1 on an arbor.

The reel shown in FIGS. 1 and 2 is easily assembled or disassembled and is particularly suitable for those having experience in similar electrical-mechanical devices. A reel 11 comprises flanges 12 and 13 that are bolted together to provide storage space for a coil of heavy duty electrical cord 14. An arbor 16 for supporting the reel 11 has one end fastened by machine screws to a single supporting member of the bracket 15. An axle 17 extends through a center opening of the flanges 12 and 13 and fits as a bearing into an axial bore 18 of the arbor 16. The axle 17 is maintained within the bore by a collar 19 of the arbor 16 and by a pan-shaped housing member 20 that has its central portion spaced from the central portion of the flange 13 only a distance slightly greater than the width in an axial direction across the collar 19.

More particularly, the axle 17 has a cylindrical head 21 (FIG. 2) that bears against the adjacent surface of the flange 12 and has a slightly raised shoulder 22 next to the head over which the central portion of the flange 12 is pressed tightly. The other flange 13 has a central opening that is a close rotative fit over the adjacent end of the arbor 16, the portion of the end long enough to support the flange 13 having a smaller diameter than the diameter of the collar 19. Preferably, a suitable grease fitting is provided on the arbor 16 for lubricating the axle 17, and the axle has a shallow groove about the central portion thereof for retaining lubricant. Before the reel 11 and the axle 17 are assembled to the arbor 16, the center turn of a strong spiral spring 23 is pressed endways over the collar 19 of the arbor. The inner end of the spiral spring 23 has a small inwardly turned loop 27 to fit into a groove 24 that extends in an axial direction across the collar 19. One side of the groove is substantially in a radial direction and the loop 27 bears against that side to prevent the inner end of the spring from turning on the fixed arbor 16 while force is applied by the spring 23 to retract the cord 14. When the axle 17 is being positioned within the arbor 16, a loop 28 at the outer end of the spring 23 is placed about a bolt or other fastener 25 that extends through the flange 13. A suitable number of bolts 26, such as carriage bolts, fasten an outer flange of the housing member 20 to the adjacent face of the flange 13.

A ratchet assembly for maintaining the cord 14 extended a desired amount in opposition to the force of the spring 23 comprises a ratchet disk 29 and a ratchet pawl 30. The disk 29 may be welded or otherwise secured to the outer face of the housing member 20. The disk 29 has a relatively large center opening centered about the opening of the housing member 20. The outer circumferential edge of the disk 29 has a plurality of notches 31 for selectively receiving the pawl 30. The pawl 30 is rotatively fastened to the inside face of the bracket 15 to rotate in a plane parallel to the face of the disk 29. The pawl 30 is a lever pivoted at a point intermediate its ends with the end that is to function as a stop directed toward the ratchet disk 29. Either a spring or a weight can be used to urge the end of the pawl 30 against the circumferential edge of the ratchet disk 29. As shown in FIG. 1, a member 35 about which the pawl 30 is pivoted is below and a little at one side of the axis of the reel 11 at such a distance that the pawl 30 is always inclined to the radial direction of the disk 29. The outer end of the pawl 30 has a weight which in this instance is a small bell 36 that functions to signal when a notch 31 is encountered by the pawl 30 as the ratchet disk 29 is being rotated. The end of the pawl 30 has a roller 32 extending axially inwardly to engage the edge of the ratchet disk 29 and to enter one of the notches 31 when the reel 11 is to be stopped.

Figure 3:
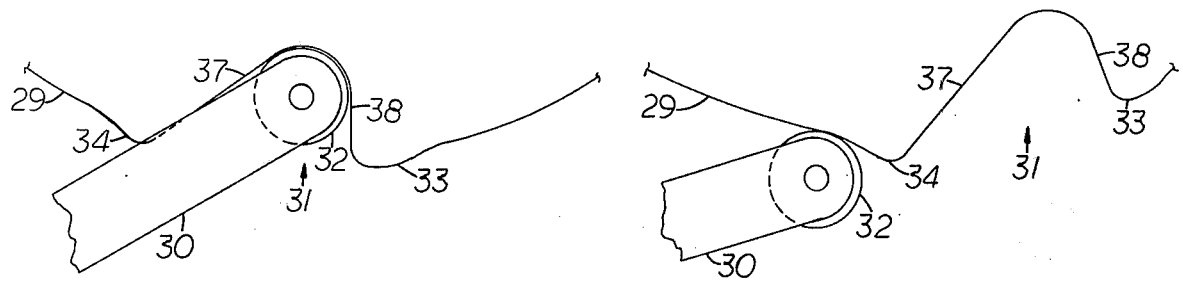
FIG. 3 is a diagrammatic view of a portion of a ratchet mechanism.

As shown in FIG. 3, a side 37 of the notch 31 is inclined with respect to a radius of the ratchet disk 29, and this side is closest to the pivot of the pawl 30 while the pawl is engaged. As the electrical cord 14 is pulled outwardly, the ratchet disk 29 tends to turn counterclockwise, and as the ratchet disk 29 starts to rotate, the roller 32 of the pawl 30 will follow the side 37 outwardly. As the cord 14 is pulled outwardly at a normal rate, a protrusion 33 along the other side 38 of the succeeding notch 31 is encountered by the roller 32. The protrusion 33 causes the circumference of the ratchet disk 29 to turn gradually but quite steeply outwardly, and when the roller 32 moves outwardly over the protrusion 33, the end of the pawl 30 is thrown outwardly and remains outwardly long enough to jump across the notch 31. After the cord 14 is extended a desired amount, it is returned slowly such that the roller 32 of the pawl 30 follows inwardly along the slanting edge 37 and bears as a stop against the edge 38 that is substantially along a radial line. The motion of the pawl 30 as it encounters a protrusion 33 or 34 causes the bell 36 to ring for alerting a person who is extending the cord 14 where to stop rotation of the reel for permitting the pawl 30 to enter a notch 31. Rather than using a bell 36 as a weight and a signaling device, a spring can be used to urge the pawl 30 against the ratchet disk 29, and electrical contacts adjacent the pawl 30 can be closed by movement of the pawl 30 for closing an electrical circuit to cause an audible signal.

When the cord 14 is to be retracted, it is pulled a short distance until the roller 32 has followed the slanting side 37 outwardly and the notch 31 is a substantial distance past the roller 32. The spring 23 is then permitted to retract the cord 14 at a moderate rate, and as the notches 31 approach the roller 32 a protrusion 34 adjacent the slanting side 37 of the notch throws the pawl 30 outwardly sufficiently to cause it to jump the notch. The notches 31 will be jumped successively until the rate of rotation of the reel is decreased sufficiently for the roller 32 to enter a notch and to function as a stop.

Figure 4:
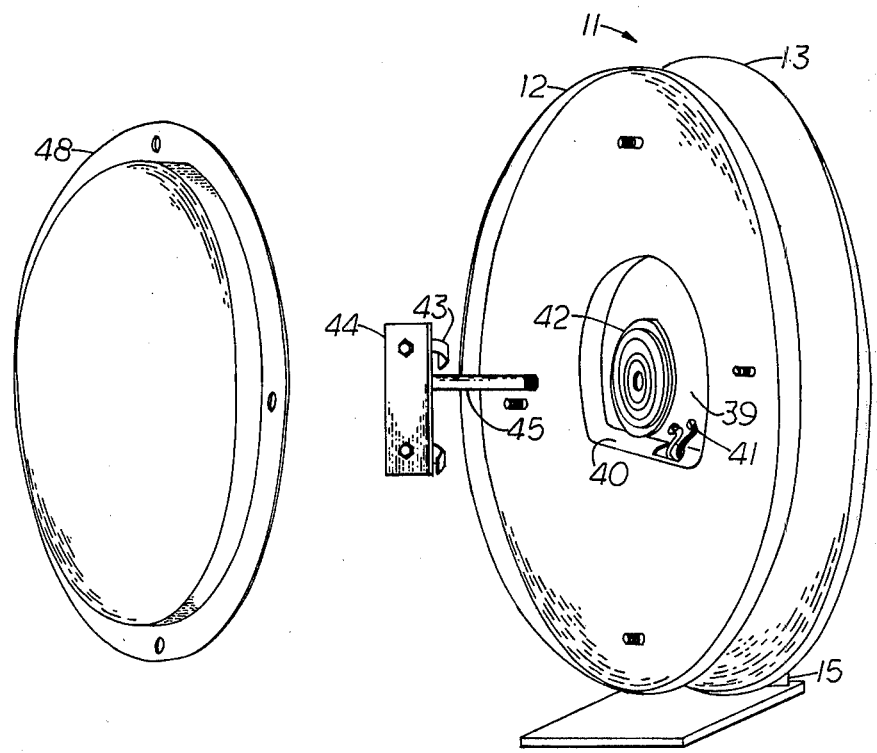
FIG. 4 is an exploded view of the side of the reel assembly of FIG. 1 to show its slip-ring assembly.

As shown in FIG. 4, the outer face of the flange 12 has a cavity 39 with a somewhat eccentric, spiral outer perpendicular wall with a flat portion 40. The wall about the cavity serves as a core of the reel on which the cord 14 is wound, and a pair of terminals 41 extends through the flat portion of the wall of the cavity for connection to respective conductors of the cord 14. A slip-ring disk 42 with a pair of concentric slip-rings has its back attached by an adhesive or by a weld to the outer face of the head 21 of the axle 17 (FIG. 2). Spring contacts 43 for contacting the rings of the slip-ring disk 42 extend from the face of an insulating block 44. A length of insulated tubing 45 extends perpendicularly between the spring contacts 43 from the face of the insulating block 44, and the axle 17 has a central bore through which the tubing 45 extends as shown in FIG. 1. The tubing 45 is long enough to extend through the arbor 16 and the bracket 15, and a retainer at the outer end of the tubing 45 causes the spring contacts 43 to bear against their respective slip-rings and prevents the contact assembly from turning. Preferably, the tubing 45 is fabricated from plastic and has external threads on its outer end. As shown in FIGS. 1 and 2, a preferred retainer 46 includes a nut secured to a strap, and a retaining screw for the arbor 16 is to extend through a lateral extending oblong hole through the strap. After the tubing 45 is turned into the retainer far enough to obtain a desired tension on the spring contacts 43, a lock nut 47 is turned tightly against the nut of retainer 46. Tension of the spring contacts 43 can be adjusted by loosening the locking nut 47 and by rotating the insulating block 44 to obtain a desired tension. A cap 48 of insulating material is fastened to the flange 12 to cover the slip-ring assembly.

Conductors 49 and 50 that are connected to a device to be supplied with power extend through the tubing 45 to terminals for respective spring contacts 43. The slip-rings for the spring contacts 43 are connected to terminals 41 of FIG. 4 that are connected to respective conductors of the cord 14. In many installations, a grounding conductor is required. Preferably, a grounding conductor 51 from the device to which power is being supplied is connected through a mounting bolt to the bracket 15. The grounding connection is completed through the bracket 15, the arbor 16 that is fabricated from conductive material, the spiral spring 23 that is in firm contact with the arbor 16, the fastener 25 at the outer end of the spring 23, to a conductor that is the grounding conductor of the cord 14. Through this arrangement, the continuity of the grounding connection is maintained reliably because no sliding contacts are required in the grounding circuit.

In a typical installation, a base of the bracket 15 is secured by screws or bolts to the floor of a recreational vehicle near the side of the vehicle where an opening is provided through which a cable passes for conveniently connecting power to the appliances in the vehicle. The grounding wire for the appliances in the vehicle is connected to the bracket by one of the mounting screws or bolts. In addition to the grounding wire, recreational vehicles generally have two wires corresponding to wires 49 and 50 of FIG. 2 to be connected to respective terminals of spring contacts 43. As described above, the grounding connection is completed to the cord 14 through the spiral spring 23 and the conductors 49 and 50 are connected through slip-ring disk 42. The side of the reel opposite the bracket is to be readily accessible so that loops of the cord 14 can be added or removed over the flange 12 to increase or to decrease respectively the tension of the spiral spring 23. Usually loops are added during cold weather to provide greater tension required to wind the cord as it becomes less flexible.

The embodiment shown in FIGS. 5–7 provides greater safety to users than that provided by the reel shown above in that the housing member 20 is secured to a flange so that it cannot be easily removed to expose a retractive spring. Part of a slip-ring assembly and an axle are a single molded nylon part that also functions to retain the flanges on an arbor. The collar about the arbor is described above is not required, and a single spring wire retainer holds the slip-ring assembly and the flanges on the arbor.

The flanges 52 and 53 of the reel of FIGS. 5–7 are similar to the flanges 12 and 13 described above. Central openings through the flanges 52 and 53 have the required diameter for supporting the flanges on a shoulder 54 (FIG. 7) of the nylon axle 55 (FIGS. 6 and 7). A nylon arbor 56 is cylindrical with a central bore for receiving the axle 55 and has a longitudinal groove along the entire length of its outer wall for receiving the inner end of a spring 60. One end of the arbor has spaced, longitudinal threaded holes about the axial bore to receive screws 58 for fastening the arbor to a rigid supporting member or bracket 57. The holes for the screws in the bracket are about a square opening for receiving the end of a tubular member that is part of a contact assembly as described below. An electrical outlet box 59 is fastened to the bracket 57 by first passing the screws 58 through the bottom of the box.

The housing member 20 for covering the spring 60 is spot-welded to the outer face of the flange 53 at points 61 spaced along a circumferential flange of the housing member 20. In order to produce a strong, light-weight reel economically, the flanges 52 and 53 and the housing member 20 are preferably fabricated from aluminum. The outer circumferential wall of the housing member 20 has a narrow, transverse slot 62 through which the outer end of the spring 60 is inserted. A short portion 73 of the outer end of the spring is turned back on itself a short distance to form a hook that bears against an edge along the slot 62. Before the housing member 20 is welded to the flange 53, not only is the outer end 73 of the spring 60 inserted through the slot 62, but a grounding conductor is connected such as by silver solder to each end of the spring 60, a grounding strap 86 being connected near the outer end of the spring 60, and a solid wire conductor 63 being connected to the inside surface of a small loop 88 on the inner end. As shown in FIGS. 5 and 7, the arbor 56 has a smooth cylindrical wall except for a narrow, longitudinal groove 64 along its full length. When the flanges 52 and 53 and the spring 60 are mounted on the arbor 56, the grounding wire 63 is positioned along the groove 64 to extend through holes within bracket 57 and within the bottom of the outlet box 59.

With reference to FIGS. 6 and 7, an axle 55 and a cylindrical holder 65 for slip-rings are preferably molded in one piece from nylon, for example, Du Pont 66 high-temperature nylon. The nylon provides suitable strength and low friction for the axle 55, and good electrical insulation and strength for the slip-ring holder 65. The nylon of the holder 65 is molded about slip-rings 67 and 68 that are spaced apart and positioned circumferentially within the inner wall of the holder 65. Conductors 49 and 50 of the cord 14 are connected in a usual manner to respective screw terminals 69 and 70 that extend through the wall of the nylon holder to the respective rings 67 and 68. The axle 55 is inserted through the central openings of the flanges 52 and 53, and the holder 65 fits coaxially in a cavity that is within the outer wall of the flange 52. The diameter of the holder 65 is substantially less than the diameter of the cavity to permit space for making the electrical connections between the outer wall of the holder 65 and the wall of the cavity in the flange 52. A grounding conductor 71 of the cable 14 is connected to a screw 72 that extends from within the cavity of the flange 52 through the wall of the flanges 52 and 53 for connection to the outer end of the spring 60.

An assembly 74 for electrical contacts includes a molded nylon piece that has a tubular retaining portion 75 with an end portion having two diametrically extending rectangular portions 76 to which respective contacts are fastened. As shown in FIG. 7, each rectangular portion has passing diametrically through it a shank 77 having at one end a cylindrical electrical contact 78 for contacting a respective ring 67 and 68, a helical spring 79 about the shank between the contact 78 and the nylon portion 75 to apply about 8 pounds (3.6 kilograms) force between the contacts 78 and their respective rings, and at the other end of the shank a usual threaded portion for connecting an electrical conductor in a usual manner. Insulated conductors 80 and 81 are connected to the respective contacts 78 and pass through opposite slanting holes between the rectangular portion 76 and the tubular portion 75 and through the tubular portion 75 into the box 59.

The flanges 52 and 53 are fastened together by four screws such as screw 82 shown in FIG. 7 that is turned into an end wall of the slip-ring holder 65 at a short distance from the axle 55. Silicone lubricant is applied to the axle during assembly, and later lubrication is not required. The axle 55 can then be inserted into an axial bore that extends through the arbor 56, while the holder 65 is placed in the cavity within the flange 52, until the shoulder 54 is against the end of the arbor 56. The contact assembly 74 is inserted through an axial bore of the axle 55 insofar as it extends within the bore of the arbor 56 and continues through the bore of the arbor 56 until the end of the tubular portion 75 extends into the box 59. A short length at the end of the tubular portion 75 is square and fits into the square hole through the bracket 57. A generally U-shaped spring retainer 83 is inserted into a groove 84 about the square end of the tubular portion 75 and bears against the outer surface of the supporting member 57 to retain the assembly for the contacts and for the tubular portion 75. A small shoulder 85 on the inner edge of the rectangular portion 76 near the tubular portion 75 bears against the adjacent end of the axle 55 to retain the axle and the parts connected thereto rotatively assembled to the arbor 56.

When the flanges 52 and 53 and the axle 55 are assembled to the arbor 56, the small loop 88 of the spring 60 slides along the groove 64 in the surface of the arbor, and the grounding wire 63 attached to the loop 88 is guided within the groove 64 and through an aligned hole in the supporting member 57 into the box 59. The grounding connection at the outer end of the spring is completed by the copper strap 86. The strap is connected such as by silver soldering to the inside surface of the spring near the bent end 73 that extends through the slot 62 within the flange of the housing member 20. The strap 86 extends inwardly and is bent to extend radially along the outer surface of the flange 53 to a point that is about even with the outer wall of the cavity for the slip-ring holder 65. A clinch nut 87 with a threaded hole is positioned through the copper strap 86 and through the flange 53 to which it is secured by clinching. To complete the grounding circuit to the conductor 71 of the cord 14, the end of the conductor 71 is connected in the usual manner by a screw 72 that is turned into the nut 87. A cap 48 as shown in FIG. 2 is attached to the outer surface of the flange 52.

The ratchet disk 29 and the pawl 30 cooperate as described for the embodiment shown in FIGS. 1-4 to control the rotation of the flanges 52 and 53. Although the embodiment shown in FIGS. 5-7 can be almost completely disassembled by merely removing the single retainer 83, the spring 60 cannot be readily removed from within the housing member 20. This feature prevents the strong spring 60 from injuring users who need not be experienced mechanics, and the feature of having a continuous ground provides the highest degree of safety from electrical shock. Although the slip-rings function reliably enough to provide power to appliances connected through the cord 14, the tendency of contacts to become open or to have high resistance occasionally cannot be tolerated where the circuit through the contacts is to prevent harmful shocks. The present ground circuit through a retractive spring of a reel provides about the same degree of safety as that to be obtained from a grounding conductor of a cord alone. The retractive spring is preferably made from an alloy of steel that includes five to ten percent copper to increase its conductivity.

I claim:

1. A reel assembly comprising:
   first and second flanges connected together,
   an electrical cord to be wound between said flanges, said cord having one end connected to said flanges and having a plurality of power conductors and a grounding conductor,
   a plurality of power supply leads and a grounding lead for appliances that utilize power,
   a stationary arbor, said arbor having one end with mounting means, a rigid supporting member, said mounting means connected to said rigid supporting member for providing full support for said arbor,
   means for rotatively mounting said first and second flanges coaxially on said arbor,
   a flat spiral electrically conductive spring having sufficient strength to retract said cord, said spring having an inner end with a turn about said arbor and an outer end connected to said first flange, said arbor having means to prevent rotation of said inner end as said spring is wound, said grounding lead for appliances electrically connected to said inner end of said spring, said grounding conductor of said electrical cord at said one end thereof connected to said outer end of said spring,
   a slip-ring assembly having a rotative portion secured to said flanges and electrically connected to said plurality of power conductors and a stationary portion secured to said rigid supporting member and electrically connected to said power supply leads, and
   ratchet means connected between said flanges and said supporting member.

2. A reel assembly as claimed in claim 1 wherein said arbor has a central bore, said rotative portion of said slip-ring assembly is fastened coaxially to said flanges at a position on said second flange opposite to both said first flange and said rigid supporting member,
   said stationary portion of said slip-ring assembly has a tubular portion extending through said bore of said arbor, and end of said tubular portion extending through said rigid supporting member, and
   retaining means connected between said end of said tubular portion and said rigid supporting member, said stationary portion bearing against said rotative portion of said slip-ring assembly to retain said rotative portion and said flanges that are connected thereto coaxially on said arbor, and
   said power supply leads extending through said tubular portion.

3. A reel assembly as claimed in claim 2 wherein said means for rotatively mounting said first and second flanges includes an axle, said axle having one end fastened to both said rotative portion of said slip-ring assembly and said flanges and the other end fitting as a bearing within said bore of said arbor, and said axle having an axial bore through which extends said tubular portion of said slip-ring assembly.

4. A reel assembly as claimed in claim 1 wherein said ratchet means comprises:
   a ratchet disk secured coaxially and rigidly to said first flange, the peripheral circular edge of said disk having at least one notch,
   a pawl comprising a rigid portion rotatively fastened to said rigid supporting member for rotation on an axis parallel to the longitudinal axis of said arbor and an end portion urged against said peripheral circular edge of said ratchet disk and adapted to enter said notch, said pawl upon entering said notch stopping rotation of said reel in the direction in which the reel is being urged by force of said spring,
   said peripheral surface of said disk having a protrusion adjacent that side of said notch that first encounters said end portion of said pawl during rotation of said reel caused by the unwinding of said spring, and said protrusion extending outwardly from the adjacent surface of said ratchet disk far enough to throw said end portion of said pawl outwardly to jump across said notch during retraction of said cord into said reel assembly at a normal rate above a predetermined slow rate.

5. A reel assembly as claimed in claim 4 having a protrusion adjacent each side of said notch to cause said end portion of said pawl to jump across said notch while said cord connected to said reel assembly is being either retracted or extended at any rate above a predetermined slow rate.

6. A reel assembly as claimed in claim 1 wherein said means to prevent rotation of said inner end of said spring includes a longitudinal groove within an outer wall of said arbor, said inner end of said spring having a curved portion fitting within said groove, said grounding lead extending within said groove and through said rigid supporting member, a conductive terminal passing through said flanges, said grounding conductor of said electrical cord being connected to one end of said terminal and a conductor connected between the other end of said terminal and said outer end of said spring.

* * * * *